(12) United States Patent
Suzuki et al.

(10) Patent No.: US 10,306,054 B2
(45) Date of Patent: May 28, 2019

(54) IMAGE FORMING APPARATUS TO WHICH NOISE COUNTER-MEASURE IS APPLIED

(71) Applicant: CANON KABUSHIKI KAISHA, Tokyo (JP)

(72) Inventors: Teruhiko Suzuki, Tokyo (JP); Masahiro Shinotsuka, Sashima-gun (JP); Kazunori Miyake, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/726,849

(22) Filed: Oct. 6, 2017

(65) Prior Publication Data

US 2018/0103142 A1  Apr. 12, 2018

(30) Foreign Application Priority Data

Oct. 12, 2016  (JP) .................................. 2016-201188

(51) Int. Cl.
| | |
|---|---|
| *H04M 1/74* | (2006.01) |
| *H04N 1/00* | (2006.01) |
| *H02M 1/12* | (2006.01) |
| *H01F 17/00* | (2006.01) |
| *H01F 27/28* | (2006.01) |
| *H01F 27/38* | (2006.01) |
| *H02M 3/335* | (2006.01) |

(52) U.S. Cl.
CPC .............. *H04M 1/74* (2013.01); *H01F 17/00* (2013.01); *H01F 27/28* (2013.01); *H01F 27/38* (2013.01); *H02M 1/12* (2013.01); *H02M 3/33507* (2013.01); *H04N 1/0001* (2013.01); *H04N 1/00082* (2013.01); *H04N 1/00994* (2013.01); *H01F 2017/0093* (2013.01); *H02M 2001/123* (2013.01); *H04M 2201/80* (2013.01)

(58) Field of Classification Search
CPC ..... H04M 1/74; H04M 2201/80; H01F 17/00; H01F 27/28; H01F 2017/0093; H02M 1/12; H02M 3/33507; H02M 2001/123; H04N 1/0082; H04N 1/0001; H04N 1/00994
See application file for complete search history.

(56) References Cited

U.S. PATENT DOCUMENTS

| | | | | |
|---|---|---|---|---|
| 4,806,894 A | * | 2/1989 | Koto ..................... | H01F 27/367 335/214 |
| 5,077,543 A | * | 12/1991 | Carlile ................ | H03H 1/0007 333/167 |
| 2005/0201126 A1 | * | 9/2005 | Uchida ................ | H02M 3/335 363/21.15 |

FOREIGN PATENT DOCUMENTS

JP  2010171636 A  8/2010

* cited by examiner

*Primary Examiner* — G. M. Hyder
(74) *Attorney, Agent, or Firm* — Rossi, Kimms & McDowell LLP (57) ABSTRACT

An image forming apparatus may have the followings. A switching transformer has a first coil, a second coil, and a first core. The switching transformer generates a secondary side current in the second coil by a magnetic flux generated in the first core by a current that flows in the first coil. A common mode choke coil has a third coil, a fourth coil, and a second core. The common mode choke coil reduces a common mode noise. The switching transformer and the common mode choke coil are mounted on a substrate so that a direction of the magnetic flux generated in the first core and a direction of a magnetic flux generated in the second core are perpendicular.

14 Claims, 9 Drawing Sheets

| DISTANCE r [mm] | 180 | 280 |
|---|---|---|
| MARGIN [dB] | -1.1 | 6.0 |

F I G. 8B

| ANGLE θ [°] | 0 | 90 |
|---|---|---|
| MARGIN [dB] | -1.1 | 8.0 |

IMAGE FORMING APPARATUS TO WHICH NOISE COUNTER-MEASURE IS APPLIED

BACKGROUND OF THE INVENTION

Field of the Invention

The present invention relates to a noise counter-measure in an image forming apparatus.

Description of the Related Art

Image forming apparatuses in which a FAX function for performing a facsimile communication via a telephone line is installed are present on the market. According to Japanese Patent Laid-Open No. 2010-171636, an image forming apparatus that connects to a telephone line via a DAA (Data Access Arrangement) which is a control circuit for controlling the telephone line is recited. A DAA functions as an NCU (Network Control Unit).

Note, in order to reduce a noise level assumed to leak from a telephone line network, a common mode choke coil may be mounted on a line I/F (interface) unit. In recent years, facsimile functions may be installed in miniaturized image forming apparatuses which form images on sheets of an A4 size or the like. It is considered that a leakage magnetic flux that a power transformer of a switching power source generated will reach the common mode choke coil when the switching power source and a facsimile substrate are adjacent due to the miniaturization of the image forming apparatus. Specifically, an induced current (noise current) generated by the magnetic flux passing through the common mode choke coil will end up flowing from the common mode choke coil to the telephone line network.

SUMMARY OF THE INVENTION

Accordingly, the present invention provides an image forming apparatus that tends not to be influenced by noise due to magnetic flux.

The present invention provides an image forming apparatus comprising the following elements. A switching transformer has a first coil, a second coil, and a first core, the first coil and the second coil being wound around the first core. The switching transformer is configured to generate a secondary side current in the second coil by a magnetic flux generated in the first core by a current that flows in the first coil. A common mode choke coil has a third coil, a fourth coil, and a second core, the third coil and the fourth coil being wound around the second core. The common mode choke coil is configured to reduce a common mode noise. The switching transformer and the common mode choke coil are mounted on a substrate so that a direction of the magnetic flux generated in the first core and a direction of a magnetic flux generated in the second core are perpendicular.

Further features of the present invention will become apparent from the following description of exemplary embodiments (with reference to the attached drawings).

DESCRIPTION OF THE EMBODIMENTS

<Image Forming Apparatus>

Figure 1:
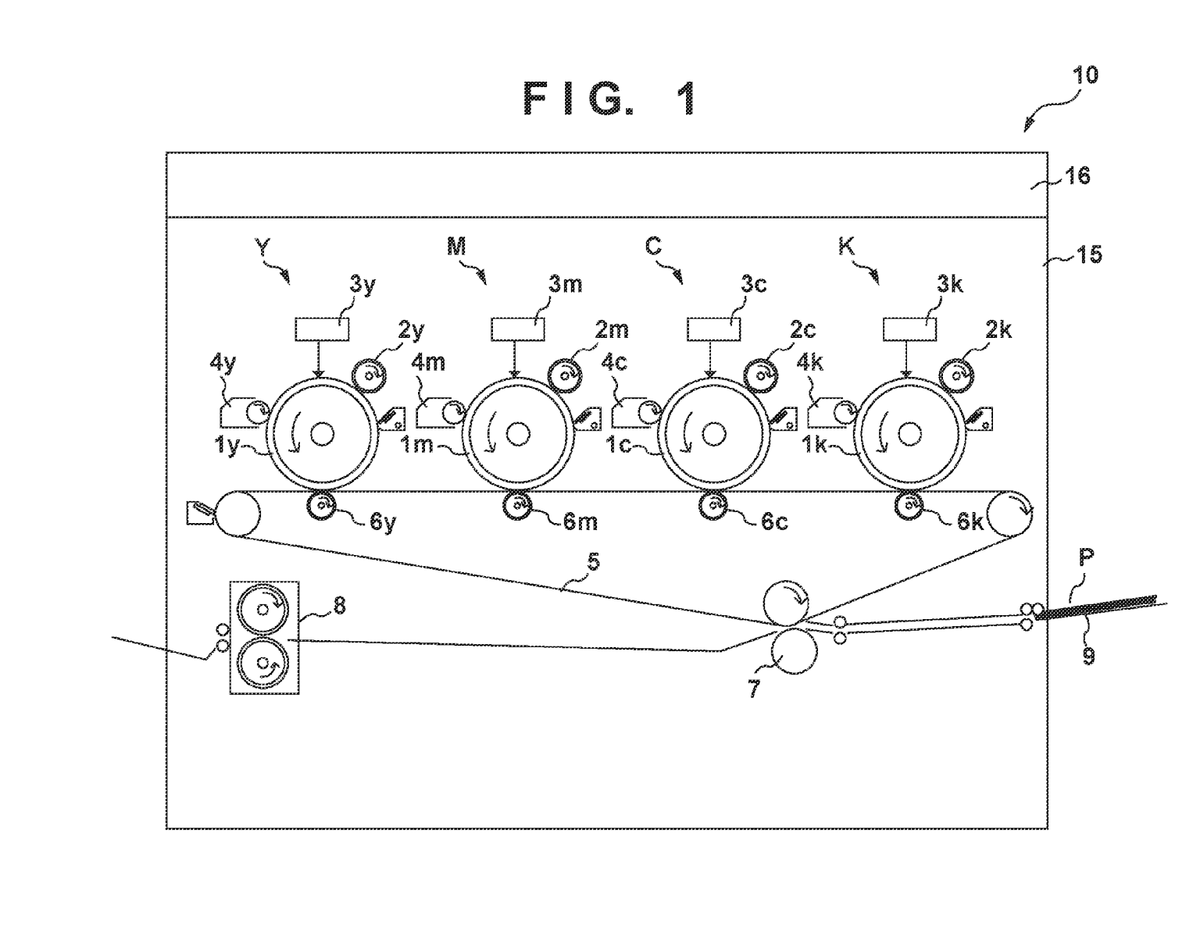
FIG. 1 is a cross-sectional view of an image forming apparatus.

FIG. 1 is a schematic cross-sectional view of an image forming apparatus 10 from a perspective of a front surface side of the image forming apparatus 10. According to FIG. 1, the image forming apparatus 10 has a reading unit 16 which reads an original, and an image forming engine 15. The image forming engine 15 has four image forming stations (image forming units) for forming a full color image by superimposing four colors of toner such as yellow (Y), magenta (M), cyan (C), and black (K). Although the characters Y, M, C, and K added to the end of a reference numeral indicate the color of the toner, the characters Y, M, C, and K are omitted when a matter common to the four colors is described. A photosensitive body 1 is a drum-shaped image carrier carrying an electrostatic latent image or a toner image. A charge roller 2 of a charging apparatus causes the surface of the photosensitive body 1 to be charged uniformly by applying a charge voltage to the photosensitive body 1. A charging voltage is generated by superimposing an alternating current voltage on a direct-current voltage. An exposure apparatus 3 is an optical scanning apparatus having a laser light source and a rotating polygonal mirror. The exposure apparatus 3 modulates and outputs a laser beam in accordance with image data, and deflects the laser beam by the rotating polygonal mirror. By this, the laser beam scans the surface of the photosensitive body 1, and an electrostatic latent image corresponding to the image data is formed. In this way, the exposure apparatus 3 functions as an exposure unit for exposing the surface of the photosensitive body uniformly charged in order to form an electrostatic latent image. A developer 4 accommodates the toner, and forms a toner image by causing toner to attach to the electrostatic latent image via a developing sleeve. A primary transfer roller 6 pinches an intermediate transfer belt 5 by cooperating with the photosensitive body 1, and transfers the toner image carried on the photosensitive body 1 to the intermediate transfer belt 5. A full color image is formed by toner images of four colors being transferred onto the intermediate transfer belt 5 in order. The intermediate transfer belt 5 conveys the toner image to a secondary transfer unit. A secondary transfer roller pair 7 and the intermediate transfer belt 5 in the secondary transfer unit conveys a sheet P, which is fed from a feed cassette 9, while pinching the sheet P. By this, the full color toner image carried on the intermediate transfer belt 5 is transferred to the sheet P. A fixing apparatus 8 causes the toner image to be fixed to the sheet P by applying heat and pressure to the sheet P and the toner image.

<Arrangement of Substrates>

Figure 2A:
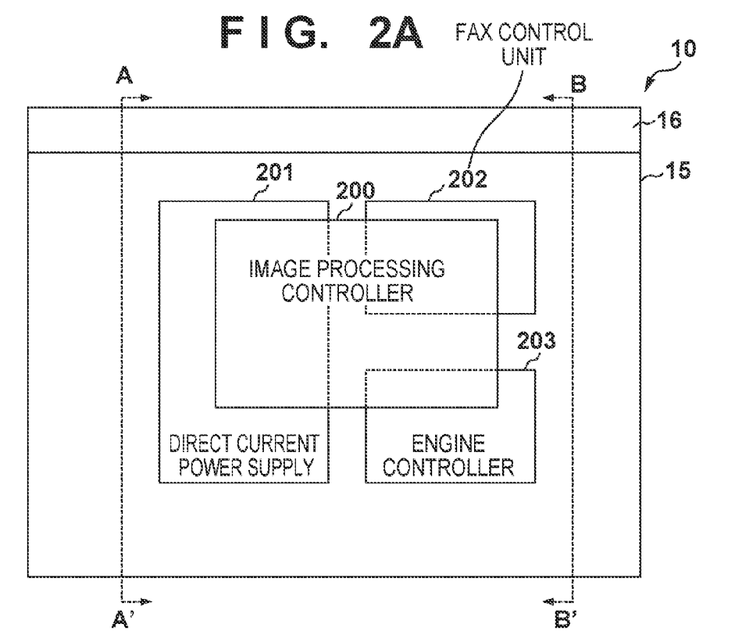
FIGS. 2A to 2C are views for describing an arrangement of multiple substrates.
Figure 2B:
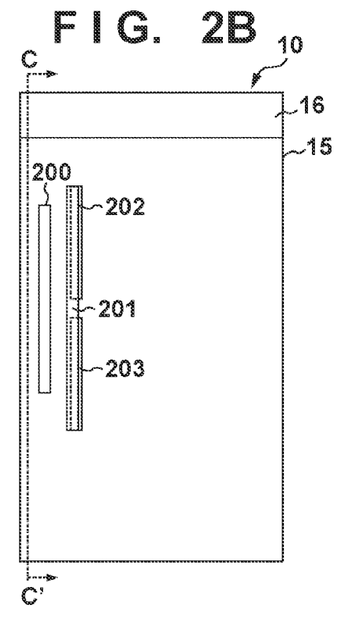
Figure 2C:
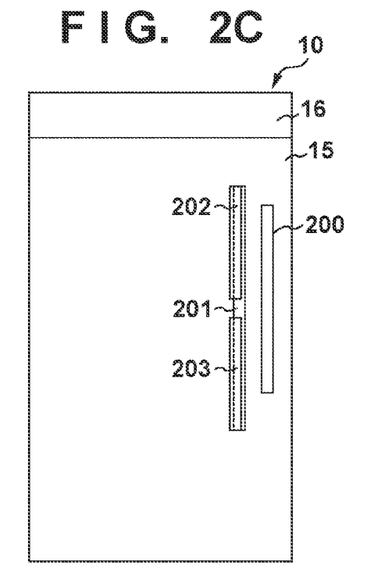

FIG. 2A is a schematic cross-sectional view (C-C' cross-sectional view) of the image forming apparatus 10 from a perspective of a back surface side of the image forming apparatus 10. FIG. 2B is a schematic cross-sectional view (B-B' cross-sectional view) of the image forming apparatus 10 from a perspective of a right surface side of the image forming apparatus 10. FIG. 2C is a schematic cross-sectional view (A-A' cross-sectional view) of the image forming apparatus 10 from a perspective of a left surface side of the image forming apparatus 10.

According to these drawings, an image processing controller 200, a direct current power supply 201, a FAX control unit 202, and an engine controller 203 are mounted on different substrates respectively. Note, reference numerals 200 to 203 may be understood as indicating substrates. The image processing controller 200 is arranged on the backmost surface from among the image processing controller 200, the direct current power supply 201, the FAX control unit 202, and the engine controller 203. The direct current power supply 201, the FAX control unit 202, and the engine controller 203 are arranged more on the front surface side of the image forming apparatus 10 than the image processing controller 200. Furthermore, the direct current power supply 201, the FAX control unit 202, and the engine controller 203 are arranged substantially on the same plane.

Because the direct current power supply 201 and the FAX control unit 202 are arranged adjacent to each other, a switching noise generated by the direct current power supply 201 may reach the FAX control unit 202. Such nearby arrangement may become common due to miniaturization of the image forming apparatus 10 which is equipped with a facsimile function.

Figure 3:
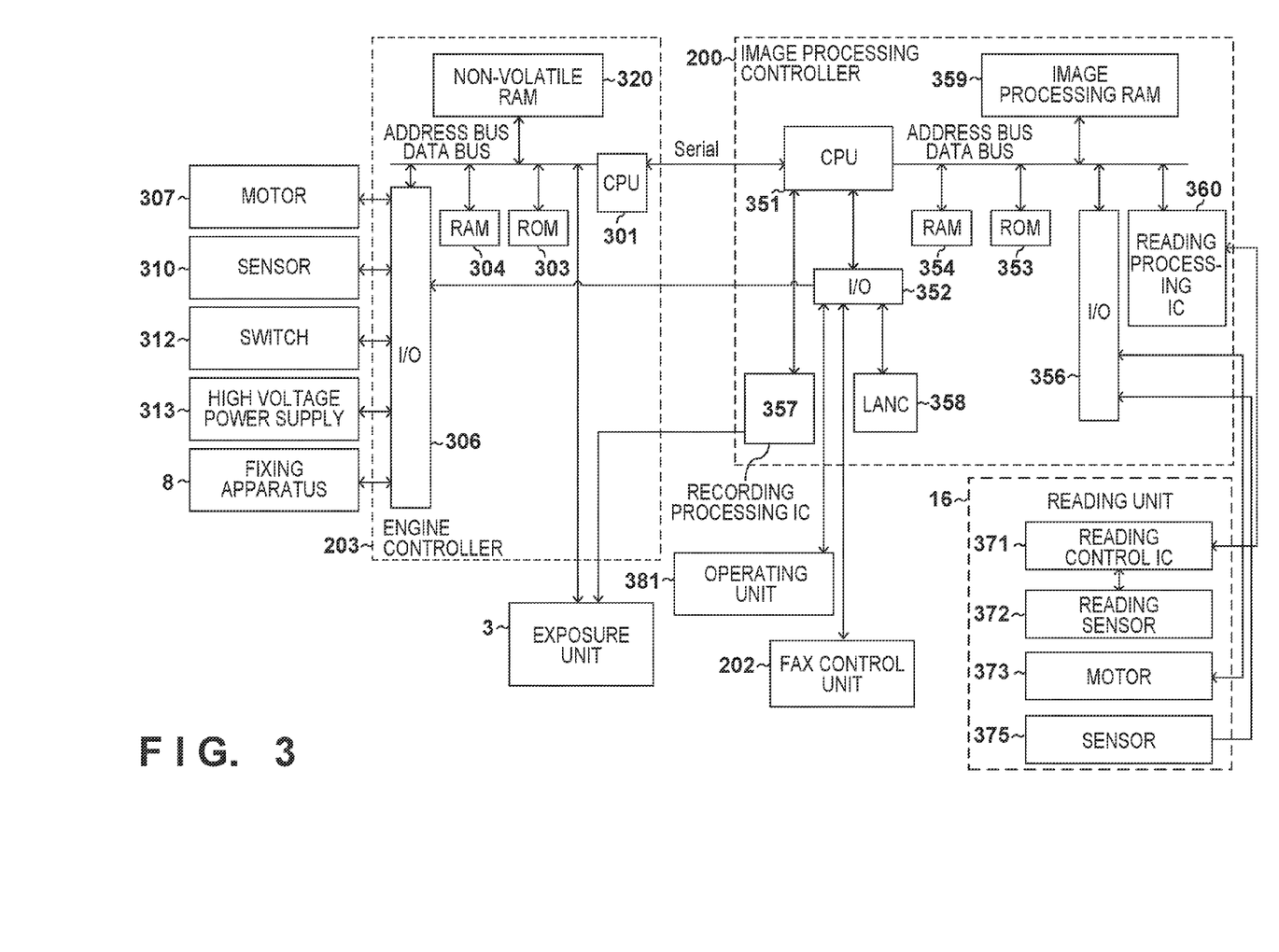
FIG. 3 is a block diagram of controllers.

FIG. 3 is a block diagram illustrating a control system of the image forming apparatus 10. The image forming apparatus 10 is equipped with two controllers: the engine controller 203 and the image processing controller 200.

The engine controller 203 controls a motor 307 which conveys the sheet P, the fixing apparatus 8, the intermediate transfer belt 5, a high voltage power supply 313, the exposure apparatus 3, and four image forming stations. A CPU 301 is a CPU in charge of image forming control, and, from a read-only memory (hereinafter referred to as a ROM 303) which stores control procedures (control programs), sequentially reads and executes the control programs. The CPU 301 and each load are connected by an address bus and a data bus. A random access memory (hereinafter referred to as a RAM 304) is used as a storage for input data, a storage region for work, or the like. A non-volatile RAM 320 is used as a storage region for parameters relating to image forming operations. Each load including the motor 307, a sensor 310, a switch 312, the high voltage power supply 313, and the fixing apparatus 8 is connected to an I/O interface 306. The motor 307 is a driving source for driving a feed system and a conveyance system. The sensor 310 includes a sheet sensor for detecting the sheet P conveyed by the conveyance system for example. The switch 312 includes a switch for detecting a home position or the like of each load. The high voltage power supply 313 generates and applies a high voltage to the charge roller 2, the developer 4, the primary transfer roller 6, and the secondary transfer roller pair 7 in accordance with an instruction that the CPU 301 outputs. The CPU 301 outputs an ON/OFF signal to the fixing apparatus 8 via the I/O interface 306, and turns the heater of the fixing apparatus 8 ON/OFF.

The image processing controller 200 performs image processing (such as color space conversion or gamma correction) on an image signal received from an externally connected device such as the reading unit 16 or a PC, generates image data, and supplies it to the exposure apparatus 3. PC is an abbreviation for personal computer. Configuration may be taken such that the image processing controller 200 stores image data, to which the image processing has been applied, in a storage medium such as a USB memory connected to an operating unit 381 or an externally connected device. A CPU 351 mounted to the image processing controller 200 sequentially reads and executes the programs from a ROM 353 which stores the image processing procedure (image processing program). Also, a RAM 354 is a main storage device used as a storage for input data, a storage region for work, or the like. A recording processing IC 357 performs image processing on the image signal from the reading unit 16 or an externally connected device, and generates image data that is supplied to the exposure apparatus 3. The recording processing IC 357 causes the laser light source to light up in accordance with the image data by transmitting the image data to the exposure apparatus 3 via the image signal line. A motor 373, a sensor 375, or the like of the reading unit 16 are connected to an I/O interface 356. The motor 373 drives a conveyance roller or the like which conveys an original. The sensor 375 includes a sensor for detecting an existence or absence of an original or the like. A reading processing IC 360 receives the image data from a reading sensor 372 via a reading control IC 371 of the reading unit 16, performs predetermined image processing on the image data, and drives the reading sensor 372. An image processing RAM 359, when performing image processing on the image data that the reading processing IC 360 received or the image data received from the externally connected device, is used as a storage region for temporarily storing the image data. The CPU 351 connects to a LAN controller 358, the operating unit 381, and the FAX control unit 202 via an I/O interface 352. The LAN controller 358 controls communication with the externally connected device connected via a LAN cable. The operating unit 381 is a user interface that accepts instructions from an operator and that outputs information to the operator. The FAX control unit 202 controls a facsimile communication.

Figure 4A:
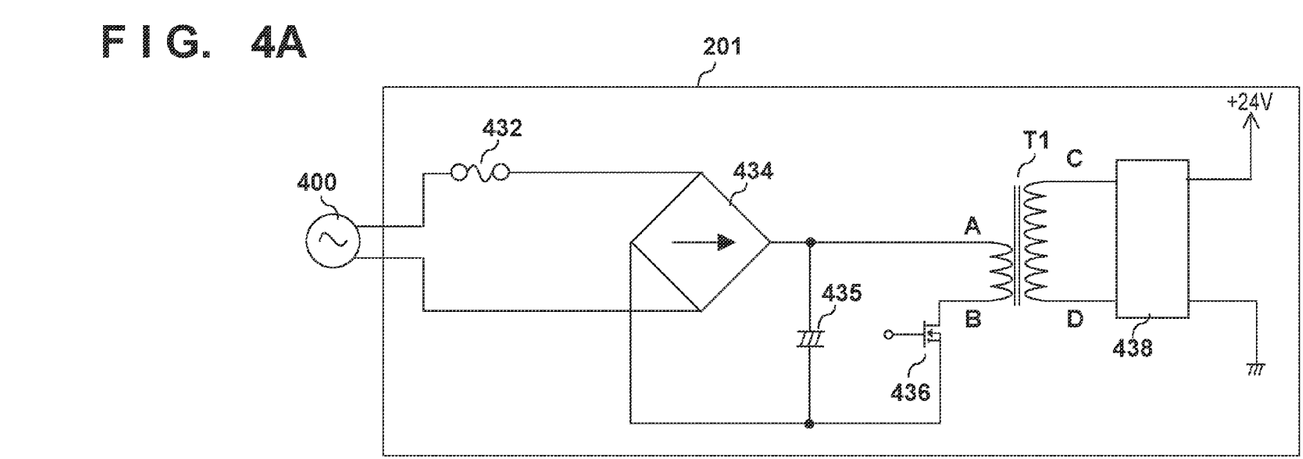
FIG. 4A is a circuit diagram of a direct current power supply.

FIG. 4A is a circuit diagram of the direct current power supply 201. The direct current power supply 201 is a power source apparatus that converts an alternating current voltage (AC 100V for example) supplied from an alternating power supply 400 such as a commercial alternating current power supply to a direct-current voltage (+24V for example), and outputs the direct-current voltage. This direct current voltage is supplied to the engine controller 203, the image processing controller 200, and the reading unit 16. The direct-current voltage may be supplied after being converted to a low direct-current voltage (+12V, +5V, or +3.3V for example) by a DC/DC converter as necessary. A current fuse 432 is inserted in one of two power supply lines connected to the alternating power supply 400. The current fuse 432 is a fuse for protecting the direct current power supply 201 when an overcurrent is supplied from the alternating power supply 400. A diode bridge 434 is a rectification circuit for rectifying the alternating current voltage. A smoothing capacitor 435 is a capacitor for smoothing a voltage that the diode bridge 434 outputs and applying it to the primary side of a switching transformer T1. A switching FET 436 is a switching element for switching a primary current flowing to a primary side coil of the switching transformer T1 in accordance with a control signal supplied to a gate. A rectification circuit 438 is a circuit for rectifying and smoothing a voltage outputted to a secondary side of the switching transformer T1.

Figure 4B:
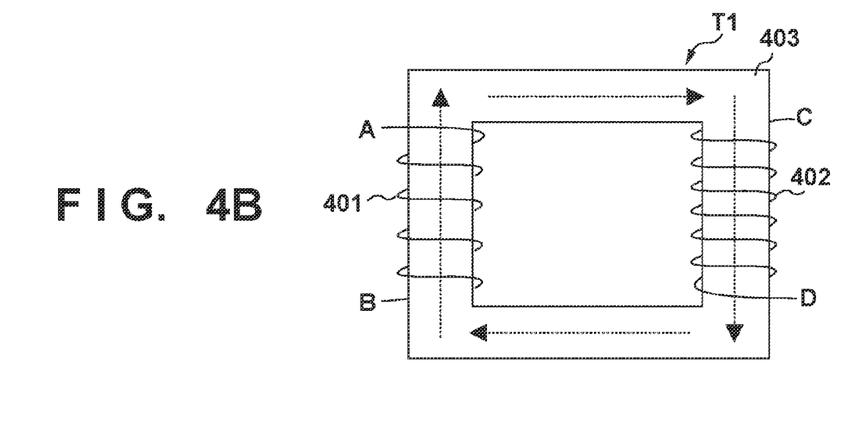
FIG. 4B is a view illustrating a configuration of a switching transformer.

FIG. 4B illustrates a common structure of the switching transformer T1. The switching transformer T1 has a primary coil 401, a secondary coil 402, and a core 403 such as an iron core or a ferrite core. The primary coil 401 and the secondary coil 402 are wound around the core 403. When the switching FET 436 connected to the switching transformer T1 is turned OFF/ON, a change of the current between A-B of the primary coil 401 occurs. Then, according to Lenz's law, an electromotive force (counter-electromotive force) in the opposite direction to the current direction is generated so as to oppose the change in current. Also, a magnetic flux in the directions that the dashed line arrow symbols indicate is generated in the interior of the core 403. Due to the magnetic flux changing, an electromotive force (induced electromotive force) is generated between C-D of the secondary coil 402 and an induced current flows.

Figure 5:
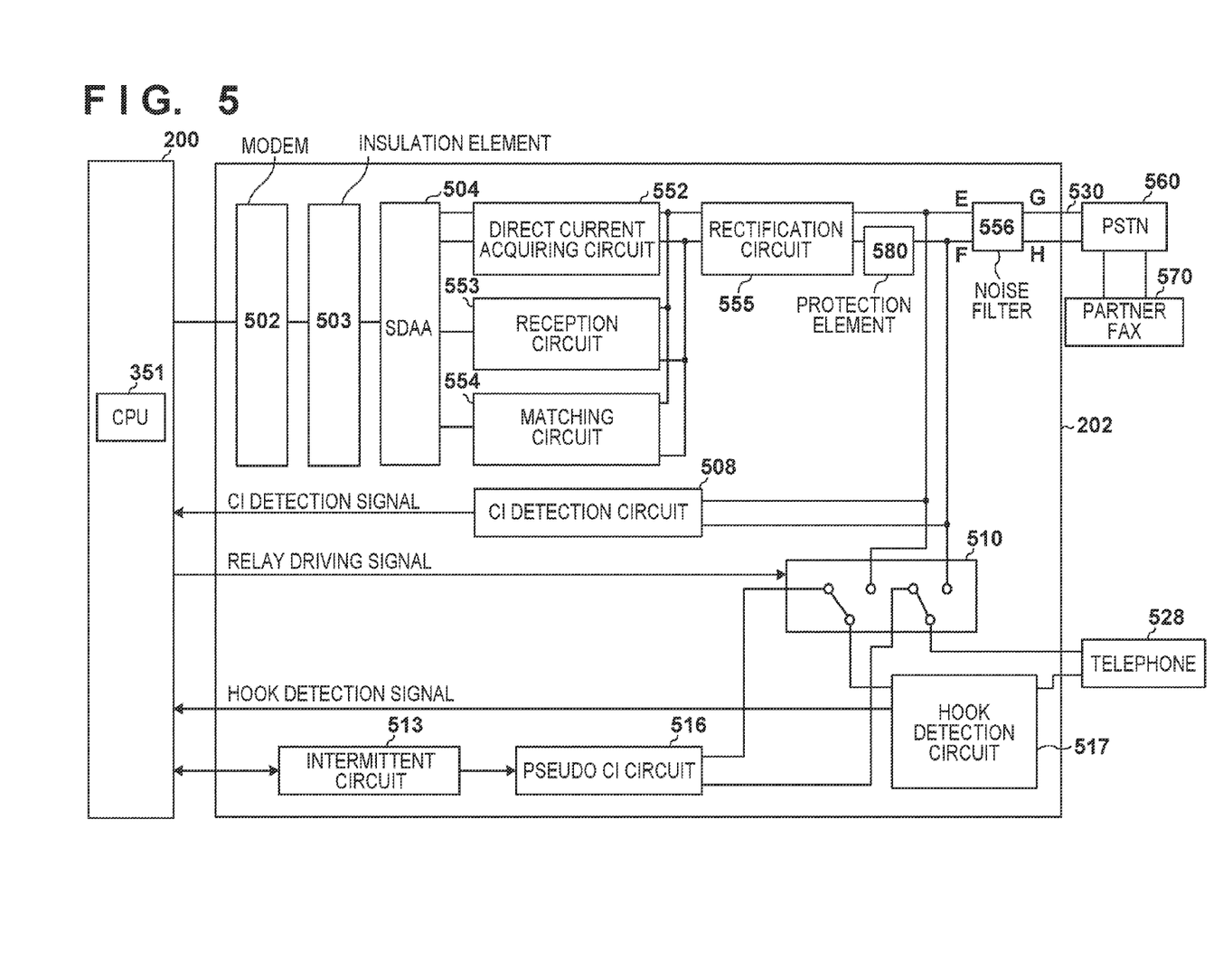
FIG. 5 is a block diagram of a FAX control unit.

FIG. 5 is a block diagram of the FAX control unit 202. A modem 502 is a modulation and demodulation apparatus connected to the image processing controller 200 and operated under control by the CPU 351. The modem 502 performs modulation processing of the image data read by the reading unit 16, which is the target of a facsimile transmission, and demodulation processing of a signal received via a communication line 530. The modem 502 is connected to an SDAA 504 via an insulation element 503. SDAA is an abbreviation of Silicon Data Access Arrangement. The SDAA 504 functions as a semiconductor NCU (Network Control Unit). The SDAA 504 controls a direct current acquiring state of the communication line 530 through a direct current acquiring circuit 552. The SDAA 504 has a function for monitoring the voltage of the communication line 530. The SDAA 504 has a function for monitoring the current flowing to the communication line 530. The SDAA 504 has a function for monitoring a dial tone signal transmitted on the communication line 530.

The direct current acquiring circuit 552 is a peripheral circuit of the SDAA 504 and is configured by a current source and a switching element such as a transistor. The direct current acquiring circuit 552 is controlled by the SDAA 504 and performs an adjustment of direct current impedance while performing a direct current acquisition by adjusting the current of the current source. The direct current acquiring circuit 552 creates a line open state and transmits a dial pulse which is a type of selection signal for the communication line 530. A rectification circuit 555 has a diode bridge or the like, and rectifies a signal from the communication line 530 and outputs it to the SDAA 504 side. A reception circuit 553 is an interface circuit for receiving a facsimile signal or the like via the communication line 530. A matching circuit 554 is a circuit that causes an alternating current impedance during communication to match a predetermined value. In the case of Japan, the predetermined value is 600 ohms.

A noise filter 556 reduces a lightning surge, electromagnetic noise, or the like from the communication line 530, and is a circuit for suppressing noise that the image forming apparatus 10 generates from being transmitted to the communication line 530. The noise filter 556 has a common mode choke coil T2 or the like.

A CI detection circuit 508 is connected to the communication line 530 via the noise filter 556, and detects a call signal (hereinafter referred to as "a CI signal") received from the communication line 530. When the CI detection circuit 508 detects a CI signal, it transmits a CI detection signal indicating this to the CPU 351. The CPU 351 determines whether or not there is a CI signal incoming call from the communication line 530 on the basis of the CI detection signal.

An H relay 510 is a circuit that connects an external telephone 528 connected via a hook detection circuit 517 to a pseudo CI circuit 516 or the communication line 530. The H relay 510 is an example of a switching unit and switches between a connection state in which the external telephone 528 is connected to the communication line 530 and a disconnection state in which the external telephone 528 is disconnected from the communication line 530. Also, the H relay 510 uses a relay driving signal 511 and is controlled by the CPU 351. Note, in a case where the telephone 528 is disconnected from the communication line 530 by the H relay 510 as FIG. 5 illustrates, the telephone 528 does not ring even if a CI signal is received. A so-called non-ringing incoming call of a facsimile apparatus is realized. The hook detection circuit 517 is one example of a detection unit, is connected to the telephone 528, and is a circuit for detecting an off-hook or an on-hook of the telephone 528. The hook detection circuit 517 transfers the detection result of the off-hook or the on-hook of the telephone 528 to the CPU 351 by using a hook detection signal. The CPU 351 determines the hook state in the telephone 528 on the basis of the hook detection signal. The hook detection circuit 517, by the H relay 510, detects the current flowing to the telephone 528 in both a case where it is directly connected to the communication line 530 and in a case where it is connected to the pseudo CI circuit 516. By this, the hook detection circuit 517 detects the off-hook or the on-hook in the telephone 528.

The pseudo CI circuit 516 is a circuit for transmitting the pseudo CI signal to the telephone 528. The pseudo CI signal is a signal sent to the telephone 528 to cause the telephone 528, in a state in which it is disconnected from the communication line 530, to ring in a case where a CI signal is received from a partner apparatus via the communication line 530. The pseudo CI circuit 516, in a case where it is not necessary to transmit a pseudo CI signal, functions as a power supply that outputs an intermittent off-hook voltage to the hook detection circuit 517. This is performed in order to detect the off-hook or the on-hook of the telephone 528. In this way, the CPU 351 can select whether the pseudo CI circuit 516 generates the pseudo CI signal or generates the intermittent off-hook voltage. An intermittent circuit 513 transmits to the pseudo CI circuit 516 a drive signal for driving the pseudo CI circuit 516. The pseudo CI circuit 516 is activated by the CPU 351 causing the intermittent circuit 513 to output the drive signal, and the pseudo CI circuit 516 transmits the pseudo CI signal to the telephone 528. In a case where the intermittent off-hook voltage is generated, control of the drive signal is handed over to the intermittent circuit 513 from the CPU 351. The pseudo CI circuit 516 transmits the intermittent off-hook voltage in accordance with the drive signal from the intermittent circuit 513. The intermittent off-hook voltage is an off-hook voltage repeating (intermittent operation) ON and OFF. A PSTN 560 is a public line network to which the communication line 530 is connected. A partner FAX 570 is connected to the FAX control unit 202 via the PSTN 560. A protection element 580 is configured by a fuse or the like and is an element for protecting the FAX control unit 202 from a surge current and the like.

Figure 6:
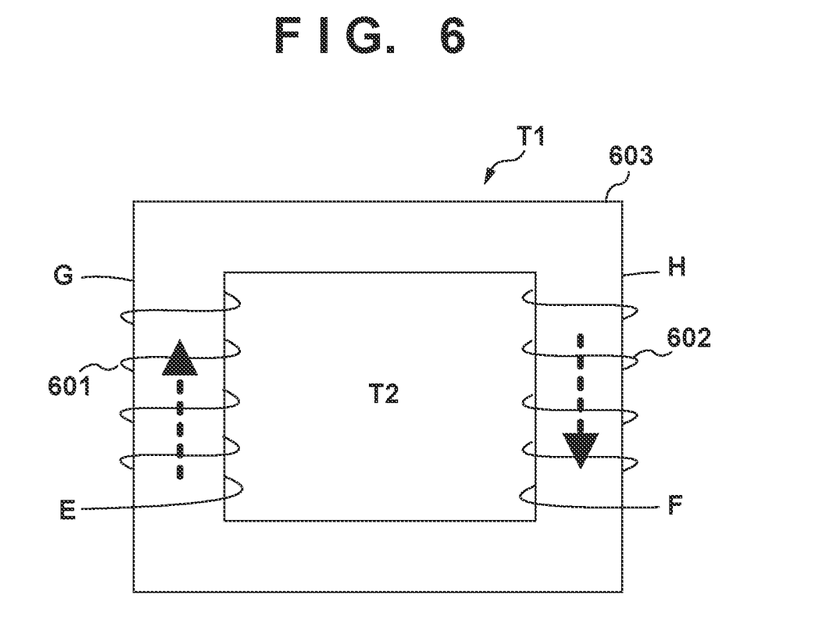
FIG. 6 is a view describing a common mode choke coil.

FIG. 6 illustrates a typical structure of the common mode choke coil T2. The common mode choke coil T2 has a first coil 601, a second coil 602, and a core 603. Although the first coil 601 and the second coil 602 wind around the core 603, the coil direction of the first coil 601 is opposite to the coil direction of the second coil 602. When a common mode current flows to the first coil 601 and the second coil 602 respectively, the direction of a magnetic flux generated inside of the core 603 by electromagnetic induction of the first coil 601 and the direction of a magnetic flux generated inside of the core 603 by electromagnetic induction of the second coil 602 match. For this reason, the core 603 acts as an inductor. By this, common mode noise is removed.

Specifically, when a common mode current flows in the direction from E to G and the common mode current flows in the direction from F to H in FIG. 6, a magnetic flux of the direction of the arrow symbol direction is generated. Note, EFGH in FIG. 5 matches with EFGH in FIG. 6.

Figure 7:
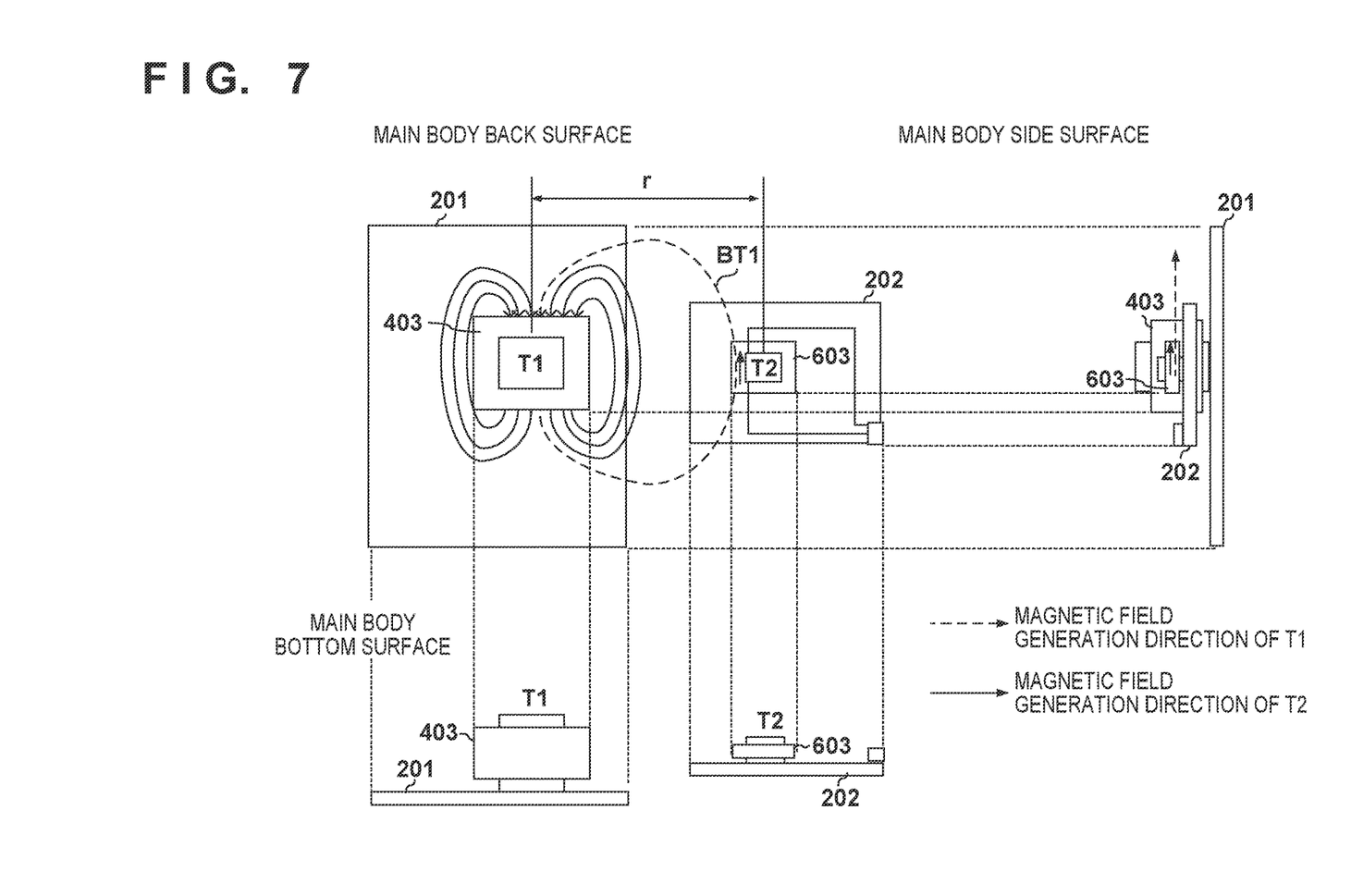
FIG. 7 is a view describing a noise generation principle.

FIG. 7 is a view describing the common mode choke coil T2 receiving a leakage magnetic flux generated by the switching transformer T1 in the comparative example. As illustrated in FIG. 7, the arrangement configuration (angle) of the switching transformer T1 and the common mode choke coil T2 is the same as in the comparative example. That is, the core surface of the switching transformer T1 and the core surface of the common mode choke coil T2 are parallel. The core surface is a surface that is parallel to the paper surface of FIG. 7. Inside of the core 403 of the switching transformer T1, a magnetic flux is generated. Inside of the core 403 of the switching transformer T1, a leakage magnetic flux BT1 is also generated. The leakage magnetic flux BT1 propagates through the air, and passes through the inside of the core 603 of the common mode choke coil T2. A magnetic flux is generated inside of the core 603 of the common mode choke coil T2, and due to a change in this magnetic flux, an electromotive force (induced electromotive force) is generated and an induced current flows in the windings. The induced current generated by the leakage magnetic flux BT1 becomes a noise current and flows out to the communication line 530. This can result in a spurious transmission of the communication line 530. Note that the strength of the magnetic flux that the magnetic field causes to be generated theoretically is represented by the following equation.

$$H = \frac{B}{4\pi \times \mu 0 \times r^2} \quad (1)$$

H is the strength of the magnetic flux. B is the magnetic flux density. $\pi$ is Pi. $\mu 0$ is the permeability of a vacuum. r is the distance. This equation means that the magnetic flux generated at a particular position attenuates in inverse proportion to the square of the distance. B and r are variables, and B corresponds to BT1 indicated in FIG. 7, and r corresponds to the distance between the center of the switching transformer T1 and the center of the common mode choke coil T2.

Figure 8A:
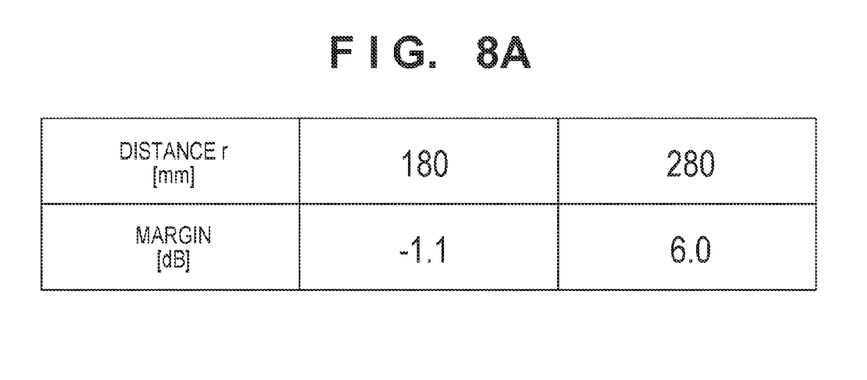
FIGS. 8A to 8B are views illustrating measurement results.

FIG. 8A is a table representing a result of measuring spurious transmissions to the communication line 530 in an arrangement relationship between the switching transformer T1 and the common mode choke coil T2 illustrated in FIG. 7. Here, it is assumed that the switching transformer T1 and the common mode choke coil T2 are arranged so that the leakage magnetic flux from the switching transformer T1 passes through the first coil 601 and the second coil 602. Alternatively, it is assumed that the leakage magnetic flux passes through the core 603 so that the magnetic flux in the core 603 is caused to change. The measurement results in FIG. 8A represent the margins corresponding to a spurious transmission standard (regulation values) at 90 kHz of New Zealand. When the distance r is made to be 180 mm, the measurement result is 1.1 dB over with respect to the regulation value. When the distance r is set to 280 mm, a margin of 6.0 dB with respect to the regulation value is obtained. The difference in the margin is 7.1 dB, but when this is converted into energy it is 2.3 times. Meanwhile, the magnetic flux of a position at 180 mm is 2.4 times in relation to the magnetic flux of a position at 280 mm. The number 2.4 is obtained by dividing the square of 280 mm by the square of 180 mm. This number almost matches 2.3 times which is the magnification of energy that is leaking from the communication line 530. Accordingly, it can be seen that the distance r between the switching transformer T1 and the common mode choke coil T2 greatly influences the regulation value of the spurious transmission standard. The distance r between the switching transformer T1 and the common mode choke coil T2 is something that also influences the spurious transmission standards of other countries, and there is no limitation to the New Zealand standard. Also, the frequency of the noise current that flows to the common mode choke coil T2 is not limited to 90 kHz. The frequency of the noise current is decided in accordance with the switching frequency of the switching transformer T1 and the material characteristics of the core material. Accordingly, there are cases in which the distance r has an influence even for frequencies other than 90 kHz.

Figure 9:
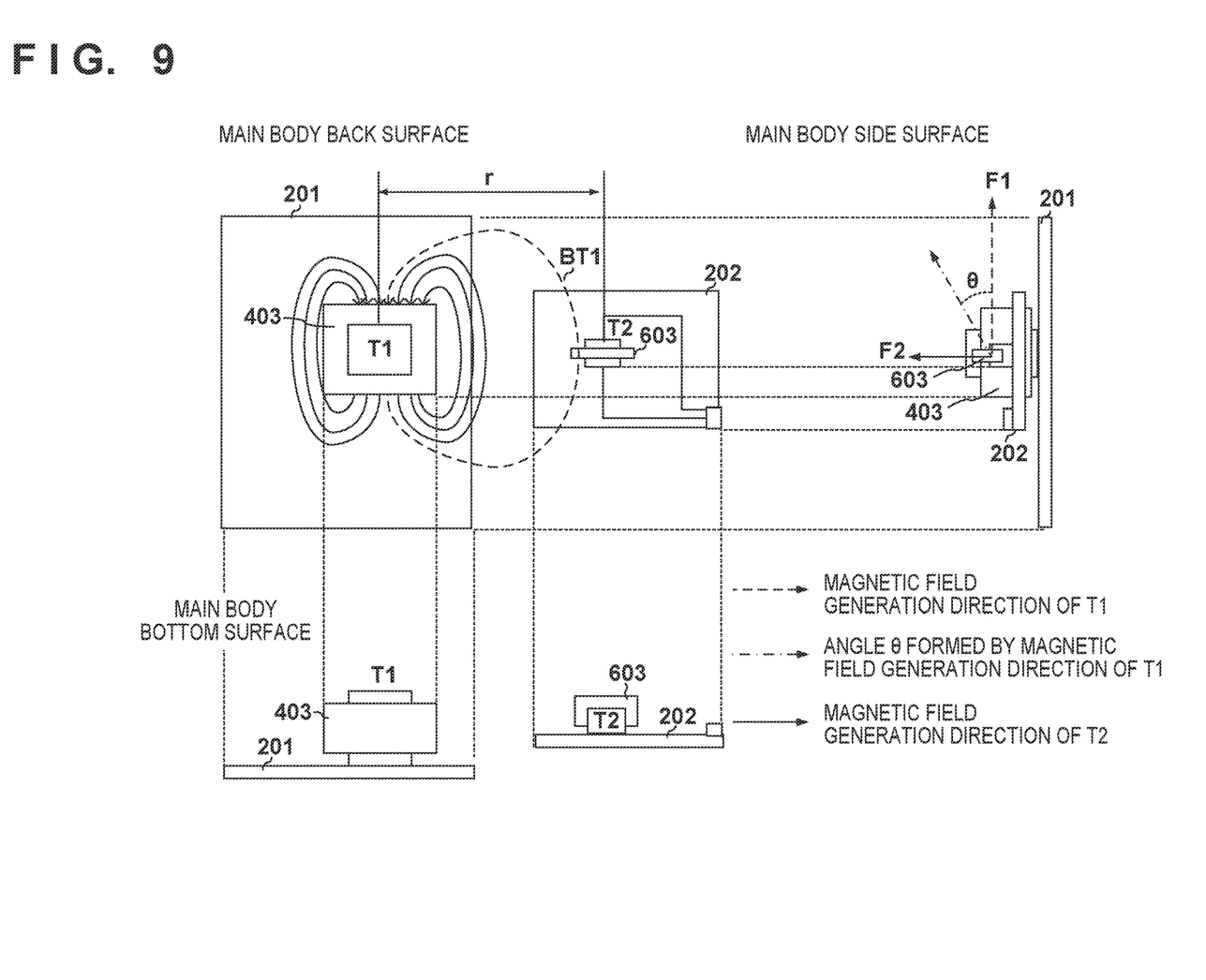
FIG. 9 is a view describing a noise reduction principle.

FIG. 9 is a view describing when the common mode choke coil T2 mostly does not receive the leakage magnetic flux BT1 generated by the switching transformer T1. The switching transformer T1 generates the leakage magnetic flux BT1. However, the common mode choke coil T2 is fixed to substrate of the FAX control unit 202 so that the core 603 of the common mode choke coil T2 is inclined 90° with respect to the direction F1 of the magnetic field that the switching transformer T1 generates. Specifically, the core surface of the core 403 of the switching transformer T1 is parallel to the direction F1 of the magnetic field, but this is perpendicular to the direction F2 of the core surface of the core 603 of the common mode choke coil T2. Accordingly, the leakage magnetic flux BT1 of the switching transformer T1 propagates in the air, but does not influence inside the core 603 of the common mode choke coil T2 much. This is described with the following theoretical formula. The angle of inclination θ of the core 603 in relation to the direction in which the magnetic field is generated and the magnetic flux generated in the core 603 are represented by the following equation.

$$BT2 = BT1 \times \cos\theta \quad (2)$$

Here, BT2 is the magnetic flux (magnetic flux density) generated in the core 603 of the common mode choke coil T2 by the influence of the leakage magnetic flux BT1. BT1 is the leakage magnetic flux (magnetic flux density) at the position of the distance r from the center of the switching transformer T1. cos θ is the cosine of the angle of inclination θ of the core 603 of the common mode choke coil T2 in relation to the direction F1 of the magnetic field of the switching transformer T1.

Equation (2) means that when the angle of inclination θ is 90° in relation to the direction F1 of the magnetic field, the magnetic flux generated in the core 603 of the common mode choke coil T2 is 0. Accordingly, the common mode choke coil T2 does not generate a noise current due to the leakage magnetic flux of the switching transformer T1 when the core 603 of the common mode choke coil T2 is arranged to be inclined 90° with respect to the direction F1 of the magnetic field of the switching transformer T1.

Figure 8B:
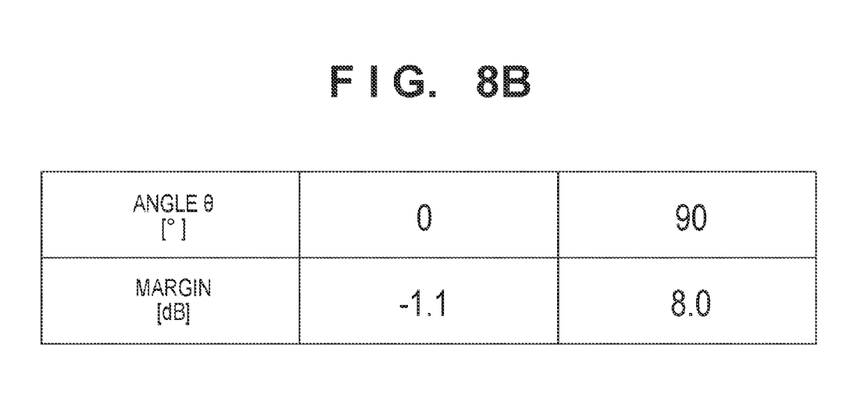

FIG. 8B illustrates a relationship between an angle of inclination and a measurement result. Here, the distance r between the switching transformer T1 and the common mode choke coil T2 is 180 mm. A spurious transmission is measured when the angle of inclination θ is 0° and when it is 90°. The measurement results are indicated as margins with respect to the regulation value of a spurious transmission standard. Similarly to FIG. 8A, the measurement results in FIG. 8B represent the margins corresponding to a spurious transmission standard at 90 kHz of New Zealand. Here, in a case where the angle of inclination θ is 0°, there is a margin shortage of 1.1 dB. Meanwhile, as when the angle of inclination θ is 90°, when the common mode choke coil T2 is caused to rotate, a margin of 8.0 dB is obtained. Accordingly, by arranging the common mode choke coil T2 to be inclined in relation to the switching transformer T1, the leakage magnetic flux that the switching transformer T1 generates tends not to influence spurious transmission.

In the foregoing embodiment, the switching transformer T1 and the common mode choke coil T2 are substantially arranged on the same plane, and the core 603 of the common mode choke coil T2 is arranged to be inclined 90° with respect to the direction in which the magnetic field of the core 403 of the switching transformer T1 is generated. Specifically, the core surface of the core 403 is parallel to the substrate, but the core surface of the core 603 is perpendicular to the substrate. However, the direction in which the core 403 of the switching transformer T1 is mounted may be changed. Specifically, the switching transformer T1 and the common mode choke coil T2 may be mounted on the substrate so that the core surface of the core 403 is perpendicular to the substrate and the core surface of the core 603 is parallel to the substrate.

There are cases in which a first substrate on which the switching transformer T1 is mounted and a second substrate on which the common mode choke coil T2 is mounted are different substrates. In such a case, by making the angle that the first substrate and the second substrate form be 90°, the leakage magnetic flux that the switching transformer T1 generates ceases to have an influence on spurious transmission. However, the core surface of the core 403 is parallel to the first substrate, and the core surface of the core 603 is parallel to the second substrate. Here, the angle of inclination of 90° is given as an example, but it is sufficient that the angle of inclination be such that the spurious transmission becomes the regulation value or less.

<Conclusion>

The primary coil 401 of the switching transformer T1 is an example of a first coil, the secondary coil 402 is an example of a second coil, and the core 403 is an example of a first core. The primary coil 401 and the secondary coil 402 are wound around the core 403. By a magnetic flux generated inside the core 403 due to a primary side current that flows in the primary coil 401, a secondary side current is generated in the secondary coil 402. The first coil 601 of the common mode choke coil T2 is an example of a third coil, and the second coil 602 is an example of a fourth coil, and the core 603 is an example of a second core. The first coil 601 and the second coil 602 are wound around the core 603. By the direction of the magnetic flux generated in the core 603 by the common mode current that flows in the first coil 601 and the direction of the magnetic flux generated in the core 603 by the common mode current that flows in the second coil 602 being the same, the common mode noise is reduced. In particular, the switching transformer T1 and the common mode choke coil T2 are mounted on the same or different substrates so that the direction of the magnetic flux generated in the core 403 and the direction of the magnetic flux generated in the core 603 are perpendicular to each other. Specifically, even if the magnetic flux generated in the core 403 by the switching changes, an induced current (noise current) tends not to be generated in the first coil 601 and the second coil 602 of the common mode choke coil T2. This is because, in this arrangement, the magnetic flux generated in the core 403 does not pass through the first coil 601 or the second coil 602. This is because, in this arrangement, the magnetic flux generated in the core 403 does not influence the magnetic flux that passes through the first coil 601 or the second coil 602. Accordingly, the image forming apparatus 10 in which noise tends not to leak is provided.

Various methods of arranging the switching transformer T1 and the common mode choke coil T2 in order to satisfy this condition can be considered. For example, the core 403 and the core 603 may be arranged so that the core surface of the core 403 and the core surface of the core 603 are perpendicular to each other. Here, the core surface is a surface that is parallel to the magnetic flux generated in the core by flowing current through the windings. For example, in the case where a core is formed by layering a plurality of conductor plates, the core surface is a surface that is parallel to the conductor plates. If the core is a ring-shaped core, the core surface is the surface that is perpendicular to the depth direction of the hole opened in the core. The ring may be a donut (a circular ring), and may be a rectangular ring.

As FIGS. 4A and 4B illustrate, the switching FET 436 is an example of a switching element for switching a primary direct-current voltage applied to the primary coil 401. The rectification circuit 438 is a rectification smoothing circuit rectifies and smooths a secondary alternating-current voltage which is outputted from the secondary coil 402 in response to the primary direct-current voltage applied to the primary coil 401 in the switching transformer T1 being switched by the switching FET 436. The switching FET 436, the switching transformer T1, and the rectification circuit 438 form the direct current power supply 201. A switching power source such as the direct current power supply 201 tends to be the cause of switching noise since a current on a primary side is switched. Note that by applying the present embodiment to a circuit in which a switching operation of a DC-DC converter or the like is performed, noise leakage is suppressed.

As illustrated in FIG. 5, the image forming apparatus 10 is equipped with a facsimile control unit (the FAX control unit 202) and performs a facsimile communication. The FAX control unit 202 comprises the common mode choke coil T2 as the noise filter 556. The reception circuit 553 is an example of an interface circuit connected via the common mode choke coil T2 to a communication line network. The partner FAX 570 is an example of a communication device connected via a communication line network. The common mode choke coil T2 is arranged to reduce the noise that arrives from outside via the communication line 530. When the switching transformer T1 is arranged near the common mode choke coil T2, a noise current may be generated in the common mode choke coil T2 due to a change of the magnetic flux of the switching transformer T1. Accordingly, the image forming apparatus 10, in which noise tends not to leak due to design of the direction of the switching transformer T1 and the direction of the common mode choke coil T2, is provided.

As described using FIG. 7 and FIG. 8A, the distance between the switching transformer T1 and the common mode choke coil T2 influences the level of the noise. If it is possible to sufficiently lengthen this distance, noise will tend not to be generated in the common mode choke coil T2, but this prevents miniaturization of the image forming apparatus 10. The distance between the core 403 and the core 603, for example, is a distance at which the spurious transmission corresponding to the communication line network is a predetermined regulation value or less when the core 403 and the core 603 are arranged so that the direction of the magnetic flux generated in the core 403 and the direction of the magnetic flux generated in the core 603 are parallel. However, even with such a distance, the spurious transmission corresponding to the communication line network will be the regulation value or less when the core 403 and the core 603 are arranged so that the direction of the magnetic flux generated in the core 403 and the direction of the magnetic flux generated in the core 603 are perpendicular to each other. That is, even if the switching transformer T1 and the common mode choke coil T2 are arranged to be close in order to miniaturize the image forming apparatus 10, by virtue of this embodiment, a spurious transmission is a regulation value or less.

So long as the arrangement of the switching transformer T1 and the common mode choke coil T2 satisfy the foregoing condition, the switching transformer T1 and the common mode choke coil T2 may be mounted on the same substrate. Similarly, the switching transformer T1 may be mounted on the first substrate and the common mode choke coil T2 may be mounted on a second substrate different from the first substrate. Also, the first substrate and the second substrate may be fixed to the image forming apparatus so that the mounting surface of the first substrate and the mounting surface of the second substrate are substantially on the same plane. Note that, the first substrate and the second substrate may be fixed to the image forming apparatus 10 so that the first substrate and the second substrate are perpendicular in order to make the core 403 and the core 603 perpendicular to each other.

As described using FIG. 9, it is not necessary to make the core 403 and the core 603 perpendicular. The core surface of the core 603 may be inclined with respect to the core surface of the core 403 so that the noise current, which is generated in the common mode choke coil T2 by the magnetic flux that leaks to the outside of the core 403 out of the magnetic flux generated in the core 403 passing through the core 603, becomes the predetermined regulation value or less. It is ideal if the angle of inclination formed by the core surface of the core 403 and the core surface of the core 603 is 90 degrees.

Also, by combining the adjustment of the distance between the core 403 and the core 603 and the adjustment of the angle of inclination formed by the core surface of the core 403 and the core surface of the core 603, the noise current may be reduced to the predetermined regulation value or less. Specifically, the core 403 and the core 603 may be separated and the core surface of the core 403 and the core surface of the core 603 may be inclined so that the noise current generated by the magnetic flux that leaks to the outside from the core 403 passing through the core 603 becomes the predetermined regulation value or less.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-201188, filed Oct. 12, 2016, which is hereby incorporated by reference herein in its entirety.

What is claimed is:

1. An image forming apparatus comprising:
a switching transformer that has a first coil, a second coil, and a first core, the first coil and the second coil being wound around the first core, the switching transformer configured to generate a secondary side current in the second coil by a magnetic flux generated in the first core by a current that flows in the first coil; and
a common mode choke coil that has a third coil, a fourth coil, and a second core, the third coil and the fourth coil being wound around the second core, the common mode choke coil configured to reduce a common mode noise;
wherein the switching transformer and the common mode choke coil are mounted on a substrate so that a direction of the magnetic flux generated in the first core and a direction of a magnetic flux generated in the second core are perpendicular.

2. The image forming apparatus according to claim 1, wherein the first core and the second core are arranged so that a core surface of the first core and a core surface of the second core are perpendicular.

3. The image forming apparatus according to claim 1, further comprising:
a switching element configured to switch a primary direct-current voltage applied to the first coil; and
a rectification smoothing circuit configured to rectify and smooth a secondary alternating-current voltage which is outputted from the second coil in response to the primary direct-current voltage applied to the first coil being switched by the switching element,
wherein the switching element, the switching transformer, and the rectification smoothing circuit form a direct current power supply.

4. The image forming apparatus according to claim 1, further comprising a facsimile control unit including the common mode choke coil and an interface circuit connected to a communication line network via the common mode choke coil, wherein the facsimile control unit is configured to perform a facsimile communication with a communication device connected via the communication line network.

5. The image forming apparatus according to claim 4, wherein a distance between the first core and the second core is such that when the first core and the second core are arranged so that the direction of the magnetic flux generated in the first core and the direction of the magnetic flux generated in the second core are parallel, a spurious transmission in relation to the communication line network is not a predetermined regulation value or less, and when the first core and the second core are arranged so that the direction of the magnetic flux generated in the first core and the direction of the magnetic flux generated in the second core are perpendicular, a spurious transmission in relation to the communication line network is a predetermined regulation value or less.

6. The image forming apparatus according to claim 1, wherein the switching transformer and the common mode choke coil are mounted on the same substrate.

7. The image forming apparatus according to claim 1, wherein the switching transformer is mounted on a first substrate, and the common mode choke coil is mounted on a second substrate different from the first substrate.

8. The image forming apparatus according to claim 7, wherein the first substrate and the second substrate are fixed to the image forming apparatus so that a mounting surface of the first substrate and a mounting surface of the second substrate are substantially on the same plane.

9. The image forming apparatus according to claim 7, wherein the first substrate and the second substrate are fixed to the image forming apparatus so that the first substrate and the second substrate are perpendicular.

10. The image forming apparatus according to claim 1, wherein the common mode choke coil reduces a common mode noise by the direction of the magnetic flux generated in the second core by a common mode current that flows in the third coil and the direction of the magnetic flux generated in the second core by the common mode current that flows in the fourth coil being the same.

11. The image forming apparatus according to claim 1, further comprising:
a switching transformer that has a first coil, a second coil, and a first core, the first coil and the second coil being wound around the first core, the switching transformer configured to generate a secondary side current in the second coil by a magnetic flux generated in the first core by a current that flows in the first coil; and
a common mode choke coil that has a third coil, a fourth coil, and a second core, the third coil and the fourth coil being wound around the second core, the common mode choke coil configured to reduce a common mode noise;
wherein a core surface of the second core is inclined with respect to a core surface of the first core so that a noise current, which is generated in the common mode choke coil by magnetic flux that leaks to the outside of the first core out of the magnetic flux generated in the first core passing through the second core, becomes a predetermined regulation value or less.

12. The image forming apparatus according to claim 11, wherein an angle of inclination that the core surface of the first core and the core surface of the second core form is 90 degrees.

13. An image forming apparatus comprising:
a switching transformer that has a first coil, a second coil, and a first core, the first coil and the second coil being wound around the first core, the switching transformer configured to generate a secondary side current in the second coil by a magnetic flux generated in the first core by a current that flows in the first coil; and
a common mode choke coil that has a third coil, a fourth coil, and a second core, the third coil and the fourth coil being wound around the second core, the common mode choke coil configured to reduce a common mode noise;
wherein the first core and the second core are separated and a core surface of the first core and a core surface of the second core are inclined so that a noise current, which is generated in the common mode choke coil by magnetic flux that leaks to the outside of the first core out of the magnetic flux generated in the first core passing through the second core, becomes a predetermined regulation value or less.

14. An image forming apparatus comprising:
a direct current power supply configured to convert an alternating-current voltage supplied from a commercial alternating current power supply into a direct-current voltage;
a facsimile control unit having a common mode choke coil and an interface circuit connected via the common mode choke coil to a communication line network, the facsimile control unit configured to perform a facsimile communication with a communication device connected via the communication line network; and
an image forming unit configured to operate by a direct-current voltage supplied by the direct current power supply and form an image on the basis of image data received by the facsimile control unit,
wherein the direct current power supply has
a switching transformer that has a first coil, a second coil, and a first core, the first coil and the second coil being wound around the first core, the switching transformer configured to generate a secondary side current in the second coil by a magnetic flux generated in the first core by a current that flows in the first coil;
a switching element configured to switch a primary direct-current voltage applied to the first coil; and
a rectification smoothing circuit configured to rectify and smooth a secondary alternating-current voltage which is outputted from the second coil in response to the primary direct-current voltage applied to the first coil being switched by the switching element,
wherein the common mode choke coil has a third coil, a fourth coil, and a second core, the third coil and the fourth coil being wound around the second core, and the common mode choke coil configured to reduce common mode noise, and
the switching transformer and the common mode choke coil are mounted on the same or different substrates so that a direction of the magnetic flux generated in the first core and a direction of a magnetic flux generated in the second core are perpendicular.

* * * * *